Patented July 11, 1939

2,165,782

UNITED STATES PATENT OFFICE 2,165,782

HALOGENATION OF TERTIARY ALCOHOLS

Benjamin T. Brooks, Old Greenwich, Conn., assignor to Standard Alcohol Co.

No Drawing. Application October 2, 1937, Serial No. 167,079

11 Claims. (Cl. 260—633)

The present invention relates to the halogenation of tertiary alcohols and more particularly to the chlorination and bromination of tertiary butyl and tertiary amyl alcohols.

It is known that the chlorination of primary and secondary alcohols leads to the formation of aldehydes and ketones and further reaction products of the latter, and not to the formation of chlorinated alcohols. Thus, ethyl alcohol on treatment with chlorine gives first acetaldehyde and this in turn forms acetal and may be chlorinated further to form chloral, or chloral hydrate and other products. Similarly, the chlorination of isopropyl alcohol yields acetone and further chlorination gives chloro derivatives of acetone. The chlorination of primary and secondary alcohols does not form chloro derivatives of these alcohols since the groups first chlorinated are the —CH$_2$OH or —CHOH groups. Thus the production of chlorohydrins, as for example ethylene chlorohydrin CH$_2$Cl.CH$_2$OH and propylene chlorohydrin CH$_3$CHOH.CH$_2$Cl is not possible by chlorinating ethyl or isopropyl alcohols, respectively. These chlorinated alcohols, or chlorohydrins are more conveniently made by the action of hypochlorous acid, or chlorine water, on the corresponding olefins. It is known, however, that when this method, particularly chlorine water, is applied to the higher ethylene homologs, chlorination to dichlorides and more highly chlorinated products are the principal products instead of the chlorohydrins.

It was discovered that when tertiary alcohols are treated with chlorine the alcohol or hydroxyl group is not attacked but chlorine is substituted, as for example

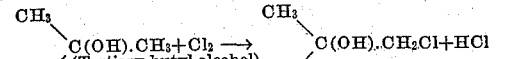
(Tertiary butyl alcohol)

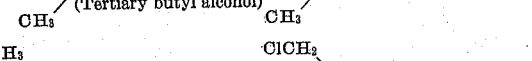
(Tertiary amyl alcohol)

and

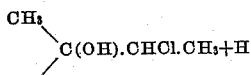

and

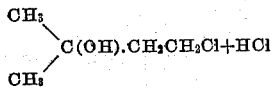

It will be noted that the above results are different from the results that would be obtained by the addition of hypochlorous acid to isobutene and trimethyl ethylene, since it is well known that hypochlorous acid does not add to a double bond exclusively in one way, but in the case of propylene and isobutene gives two isomeric chlorohydrins. In the case of trimethyl ethylene the addition of hypochlorous acid might theoretically give the first two chloro tertiary amyl alcohols shown above, but could not give the third product shown above, 2 methyl, 2 hydroxy 4 chloro butane.

It was found, however, that in order to obtain high yields of the desired chloro tertiary alcohols, it is necessary to neutralize the free hydrochloric acid which is formed by the chlorinating reaction, since the free hydrochloric acid reacts readily with the tertiary alcohol group to give dichloride, as expressed by the equations (1) 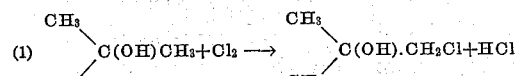

(2) 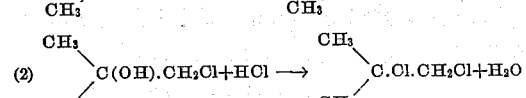

and similarly for other tertiary alcohols.

For the same reason it was found advantageous to use aqueous solutions of the alcohols rather than the anhydrous alcohols, the dilution of the hydrochloric acid decreasing the formation of dichlorides. To neutralize the free hydrochloric acid, a strong alkali cannot be used in excess, since strong alkalies decompose the chloro alcohols to give alkylene oxides, glycols and other products. The most satisfactory results, i. e. highest yields of chloro tertiary alcohols, are obtained by employing aqueous solutions of the tertiary alcohols, preferably containing 15 to 25 per cent of the alcohols and as a neutrailzing agent a substantially neutral compound capable of effecting metathesis with an acid, such as finely-divided calcium or magnesium carbonate. Precipitated chalk gives excellent results. It is also advantageous to add the chalk in amounts corresponding to the degree of chlorination desired so that when the chalk has been dissolved by the hydrochloric acid formed in the reaction, the completion of the chlorination to the desired extent is indicated. However, a larger excess of chalk is permissible if the coarse of the chlorination is determined in other ways, as by weighing or metering the chlorine added. The accumulation of calcium chloride in the solution, as the reactions progress, serves to salt out the chloro tertiary alcohols. The reaction products may be purified by distillation in suitable apparatus. Chlorinated tertiary alcohols containing more than one substituted chlorine atom are preferably distilled under reduced pressure to avoid decomposition.

The following examples illustrate the process of the present invention.

One kilogram of tertiary butyl alcohol was added to 4 liters of water and 675 grams of precipitated chalk. Chlorine was then passed into the mixture at ordinary temperatures until the chalk was dissolved. The upper layer was separated from the calcium chloride solution and distilled. After a fore-running of water and unchanged tertiary butyl alcohol was collected, the chloro tertiary butyl alcohol boiling at 125–127° C. was collected, weighing 1030 grams.

A higher boiling residue consisting mainly of dichloro tertiary butyl alcohol and weighing 265 grams was distilled under reduced pressure for purification.

In another example, 600 grams tertiary amyl alcohol was added to 3 liters of water and 340 grams of chalk. Chlorine was then passed in until substantially all the chalk was dissolved. The upper oily layer was removed from the aqueous calcium chloride solution and distilled, obtaining 580 grams mono chloro tertiary amyl alcohols and 150 grams residual chloro tertiary amyl alcohols.

Bromine reacts with tertiary alcohols in the presence of a neutralizing agent and preferably in aqueous solution to give bromo tertiary alcohols. The reaction is less rapid than in the case of chlorine and is favored by sunlight. The conditions for suppressing the replacement of the hydroxyl group by bromine are the same as in the chlorination already described. The bromo tertiary alcohols are not as stable as the corresponding chloro derivatives and should be distilled under a good vacuum, if distilled for purification.

Mono and dibromo tertiary butyl alcohol were made under the same general conditions already described. Tertiary butyl alcohol, 200 grams, were added to 1 liter of water and 140 grams of precipitated chalk. To the mixture 430 grams of bromine were added gradually. The reaction was hastened by warming to about 60–70° C. and illuminating by sunlight. When all of the bromine had reacted, the two liquids were separated and the bromo tertiary alcohols distilled in a vacuum. The principal product 440 grams was mono bromo tertiary butyl alcohol.

Both chlorination and bromination reactions can be carried further than the mono and di halogen derivatives given in the above illustrative examples, without departing in any important essential from the conditions given. For example, trichloro and tribromo tertiary butyl alcohols can be made in the same manner, using the requisite proportions of chlorine and bromine, respectively.

The chloro and more particularly the bromo tertiary butyl and tertiary amyl derivatives are known to be of value medicinally for their soporific properties. The chloro derivatives are useful intermediates for the production of the corresponding alkylene oxides, glycols and other products.

It is not intended to limit this invention to the examples given above, as it is intended to claim the invention as broadly as possible in view of the prior art.

I claim:

1. A process of halogenating tertiary alcohols, which comprises treating a tertiary alcohol with a halogen selected from the group consisting of chlorine and bromine in the presence of a substantially neutral compound capable of effecting metathesis with an acid.

2. A process of halogenating tertiary alcohols according to claim 1 in which the treatment is carried out in the presence of water.

3. A process of halogenating tertiary alcohols, which comprises treating an aqueous solution of a tertiary alcohol with a halogen selected from the group consisting of chlorine and bromine and neutralizing the acidic compounds as formed.

4. A process of halogenating tertiary alcohols according to claim 3 in which the acidic compounds are neutralized by means of an alkaline earth metal carbonate.

5. A process of halogenating tertiary alcohols, which comprises treating an aqueous solution of a tertiary alcohol with a halogen selected from the group consisting of chlorine and bromine in the presence of a substantially neutral alkaline earth metal compound, separating the halogenated tertiary alcohol from the aqueous alkaline earth halide solution, and fractionating the halogenated tertiary alcohol.

6. A process of halogenating tertiary alcohols according to claim 5 in which the tertiary alcohol contains not more than 6 carbon atoms to the molecule.

7. A process of halogenating tertiary alcohols, which comprises treating an aqueous solution of a tertiary alcohol with a halogen selected from the group consisting of chlorine and bromine in the presence of a sufficient quantity of an alkaline earth metal carbonate to neutralize the halogen acid formed during the reaction, separating the halogenated tertiary alcohol from the aqueous alkaline earth solution and purifying the halogenated products by fractional distillation.

8. A process of halogenating tertiary butyl alcohol, which comprises treating a 15 to 25% aqueous solution of tertiary butyl alcohol with chlorine in the presence of calcium carbonate, separating the chlorinated tertiary butyl alcohol from the aqueous solution and purifying by fractional distillation.

9. A process of brominating tertiary butyl alcohol, which comprises adding bromine to a 15 to 25% aqueous solution of tertiary butyl alcohol in the presence of calcium carbonate, separating the brominated tertiary butyl alcohol from the aqueous solution and purifying by fractional distillation.

10. A process of chlorinating tertiary amyl alcohol, which comprises treating a 15 to 25% aqueous solution of tertiary amyl alcohol in the presence of calcium carbonate, separating the chlorinated tertiary amyl alcohol from the aqueous solution and purifying by fractional distillation.

11. A process of brominating tertiary amyl alcohol, which comprises treating a 15 to 25% solution of bromine in the presence of calcium carbonate, separating the brominated tertiary amyl alcohol from the aqueous solution and purifying by fractional distillation.

BENJAMIN T. BROOKS.